US009599121B2

United States Patent
Fabre et al.

(10) Patent No.: US 9,599,121 B2
(45) Date of Patent: Mar. 21, 2017

(54) DEVICE AND METHOD FOR CONTROLLING THE PITCH OF BLADES

(71) Applicant: SNECMA, Paris (FR)

(72) Inventors: Adrien Fabre, Moissy-Cramayel (FR); Norbert Lartigue, Moissy-Cramayel (FR)

(73) Assignee: SNECMA, Paris (FR)

( * ) Notice: Subject to any disclaimer, the term of this patent is extended or adjusted under 35 U.S.C. 154(b) by 224 days.

(21) Appl. No.: 14/436,199

(22) PCT Filed: Oct. 8, 2013

(86) PCT No.: PCT/FR2013/052402
§ 371 (c)(1),
(2) Date: Apr. 16, 2015

(87) PCT Pub. No.: WO2014/060681
PCT Pub. Date: Apr. 24, 2014

(65) Prior Publication Data
US 2015/0285262 A1 Oct. 8, 2015

(30) Foreign Application Priority Data
Oct. 18, 2012 (FR) ...................................... 12 59952

(51) Int. Cl.
*F01D 7/00* (2006.01)
*F04D 29/32* (2006.01)
(Continued)

(52) U.S. Cl.
CPC .......... *F04D 29/323* (2013.01); *B64C 11/306* (2013.01); *F01D 7/00* (2013.01);
(Continued)

(58) Field of Classification Search
CPC .... F04D 29/323; F04D 29/663; F04D 29/668; F04D 29/362; F04D 15/0055;
(Continued)

(56) References Cited

U.S. PATENT DOCUMENTS 3,873,236 A * 3/1975 Gall .......................... F01D 7/00
416/156
4,657,484 A * 4/1987 Wakeman ............. B64C 11/306
415/130
(Continued)

FOREIGN PATENT DOCUMENTS

FR 2765550 A1 7/1997
FR 2942644 2/2009
(Continued)

OTHER PUBLICATIONS

French Preliminary Search Report dated Jul. 10, 2013 (PCT/FR2013/052402) ( 2 pages).
(Continued)

*Primary Examiner* — John K Fristoe, Jr.
*Assistant Examiner* — Behnoush Haghighian
(74) *Attorney, Agent, or Firm* — Blakely Sokoloff Taylor & Zafman LLP

(57) ABSTRACT

The invention concerns a device (1) for controlling the pitch of the blades of a fan (4) rotor (3), comprising a radial shaft (6) linked to the blade, a connection rod (8) of which the axial movement controls the rotation of the radial shaft (6), characterized in that it comprises:—a first part (10) that is mobile in rotation with the rotor (3) about the axis (11) of the fan (4), and on which one end of each connection rod (8) is secured,—a second part (12) linked to the first part (10), and—at least three cylinders (14) capable of moving said second part (12) in axial translation, and of varying the tilt of said second part, the translation and tilt of the second part
(Continued)

(12) driving a corresponding translation and tilt of the first part (10), such that, when the first part (10) rotates, each connection rod (8) is subject to axial displacement of which the amplitude is variable and is a function of the tilt of the first part (10), making it possible to vary the pitch of the blade during the rotation of same. The invention also concerns a fan, and a method for controlling the pitch of blades.

13 Claims, 7 Drawing Sheets

(51) Int. Cl.
| | |
|---|---|
| *F02K 3/072* | (2006.01) |
| *F04D 29/66* | (2006.01) |
| *F04D 29/36* | (2006.01) |
| *B64C 11/32* | (2006.01) |
| *B64C 11/30* | (2006.01) |
| *B64D 27/00* | (2006.01) |

(52) U.S. Cl.
CPC ............ *F02K 3/072* (2013.01); *F04D 29/663* (2013.01); *F04D 29/668* (2013.01); *B64C 11/30* (2013.01); *B64C 11/32* (2013.01); *B64D 2027/005* (2013.01); *F04D 29/362* (2013.01); *F05D 2220/36* (2013.01); *F05D 2260/74* (2013.01); *F05D 2260/961* (2013.01); *Y02T 50/66* (2013.01); *Y02T 50/673* (2013.01)

(58) Field of Classification Search
CPC ..... F04D 27/002; B64C 11/306; B64C 11/32; B64C 11/30; F01D 7/00; F02K 3/072; B64D 2027/005; F05D 2220/36; F05D 2260/961; F05D 2260/74
USPC ......... 416/155, 156, 162, 167, 168 R, 168 A
See application file for complete search history.

(56) References Cited

U.S. PATENT DOCUMENTS

| | | | | |
|---|---|---|---|---|
| 4,704,862 A | * | 11/1987 | Dennison | ................. F01D 7/00 416/162 |
| 4,934,140 A | * | 6/1990 | Dennison | ................. F02C 7/20 244/54 |
| 5,154,580 A | * | 10/1992 | Hora | ..................... B64C 11/306 416/129 |
| 5,242,265 A | * | 9/1993 | Hora | ..................... B64C 11/32 416/129 |
| 8,985,954 B2 | * | 3/2015 | Balk | ..................... B64C 11/32 415/129 |

FOREIGN PATENT DOCUMENTS

| | | |
|---|---|---|
| WO | WO 2010/086338 A2 | 8/2010 |
| WO | WO 2010/136684 A1 | 12/2010 |
| WO | WO 2012/131271 A1 | 10/2012 |

OTHER PUBLICATIONS

International Search Report dated Jan. 16, 2014 (FR 1259952) (3 pages).

* cited by examiner

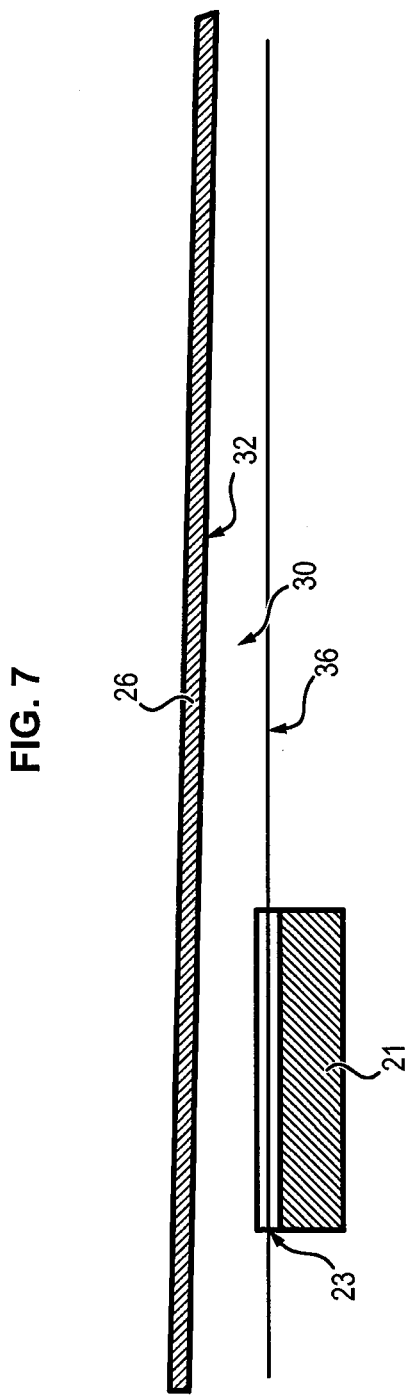

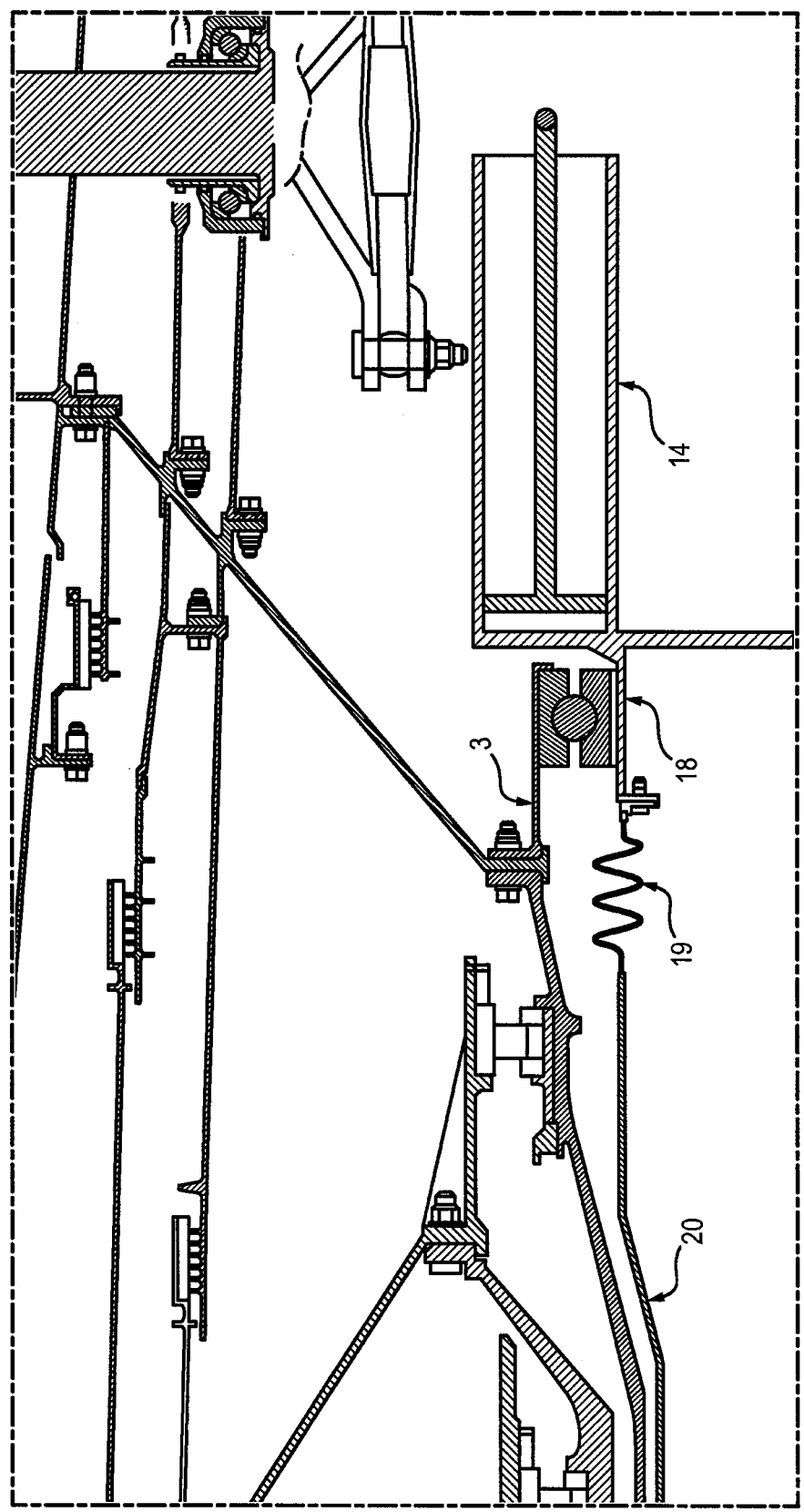

DEVICE AND METHOD FOR CONTROLLING THE PITCH OF BLADES

TECHNICAL FIELD

The invention relates to a device for controlling the pitch of the blades of a fan rotor, and a fan comprising such a device.

The invention also relates to a method for controlling the pitch of the blades of a fan rotor using this device.

PRESENTATION OF PRIOR ART

Turbomachine fans comprising at least one rotor and variable pitch blades are known in the state of the art.

The geometric pitch is the angle formed by the chord of the profile of the blade and the engine rotation axis.

This can be achieved using a known device comprising a radial shaft linked to the blade by a pivot, a connecting rod which axial displacement controls rotation of the radial shaft, and an axisymmetric part to which all connecting rods are attached.

A cylinder controls the axial displacement of the axisymmetric part, which causes an axial displacement of the connecting rods so that the pitch of all the blades can be adjusted uniformly.

A non-homogeneous aerodynamic flow is applied to the blades due to various factors, particularly including the effects of the aircraft incidence, for example at takeoff, and wake effects due to the presence of the engine, wings, fuselage or other elements such as the pylon connecting the engine to the aircraft.

This non-homogeneity induces loads on the blades and more generally on the pitch control device.

The blades are also subject to deformations resulting from gyroscopic effects related to aircraft manoeuvres.

The above-mentioned loads and deformations may lead to premature mechanical wear of fan parts, such as blades or the pitch control device.

In the case of fans comprising an upstream propeller rotor and a downstream propeller rotor, an undesirable coupling may exist between the blades of the upstream rotor and the blades of the downstream rotor.

This coupling is both mechanical, which means that undesirable mechanical vibrations can be amplified, and noisy, which induces amplification of sound vibrations.

PRESENTATION OF THE INVENTION

The invention discloses a device for controlling the pitch of fan rotor blades in order to overcome the disadvantages of the state-of-the-art, comprising a radial shaft linked to the blade by a pivot and a connecting rod for which axial displacement controls rotation of the radial shaft, characterised in that it comprises a first part that is mobile in rotation with the rotor about the fan axis and on which one end of each connecting rod is secured, a second part linked to the first part, and at least three cylinders capable of moving said second part in axial translation and varying its tilt, translation and tilt of the second part leading to a corresponding translation and tilt of the first part, such that when the first part rotates, each connecting rod follows an axial displacement with a variable amplitude that depends on the tilt of the first part, in order to vary the pitch of the blade during its revolution.

The invention relates to a turbomachine fan comprising at least one rotor and variable pitch blades, characterised in that it comprises said pitch control device for its blades.

Finally, the invention also relates to a method for controlling the pitch of the blades of a fan rotor making use of said control device, characterised in that it includes the step consisting of controlling the cylinders to modify the tilt of the first part, such that during rotation of the first part, an axial displacement is applied to each connecting rod, the amplitude of which is variable and depends on the tilt of the first part, the blade pitch varying during its revolution about the fan axis.

The invention can be used to vary the pitch of each blade during its rotation. In particular, the blade pitch varies depending on its position within the turn.

Thus, an appropriate setting of the pitch control assures that the device and the fan are not subjected to aerodynamic flow disturbances due to specific obstacles (wings, fuselage, etc.).

Consequently, the fan is more robust and has a longer life.

Moreover, coupling between the upstream rotor blades and the downstream rotor blades is reduced, which reduces undesirable mechanical and noise amplifications.

Finally if failure occurs, the device has a degraded operating mode which avoids the need to do an immediate engine shutdown.

PRESENTATION OF THE FIGURES

Other characteristics and advantages of the invention will become clear from the following description given purely for illustrative purposes and that is in no way limitative, and should be read with reference to the appended drawings in which:

FIG. 7 shows an embodiment of the guidance of the device relative to tilted part of the rotor;

FIG. 8 shows attachment parts of the device in a fan;

DETAILED DESCRIPTION

Device for Controlling the Blade Pitch

Figure 1:
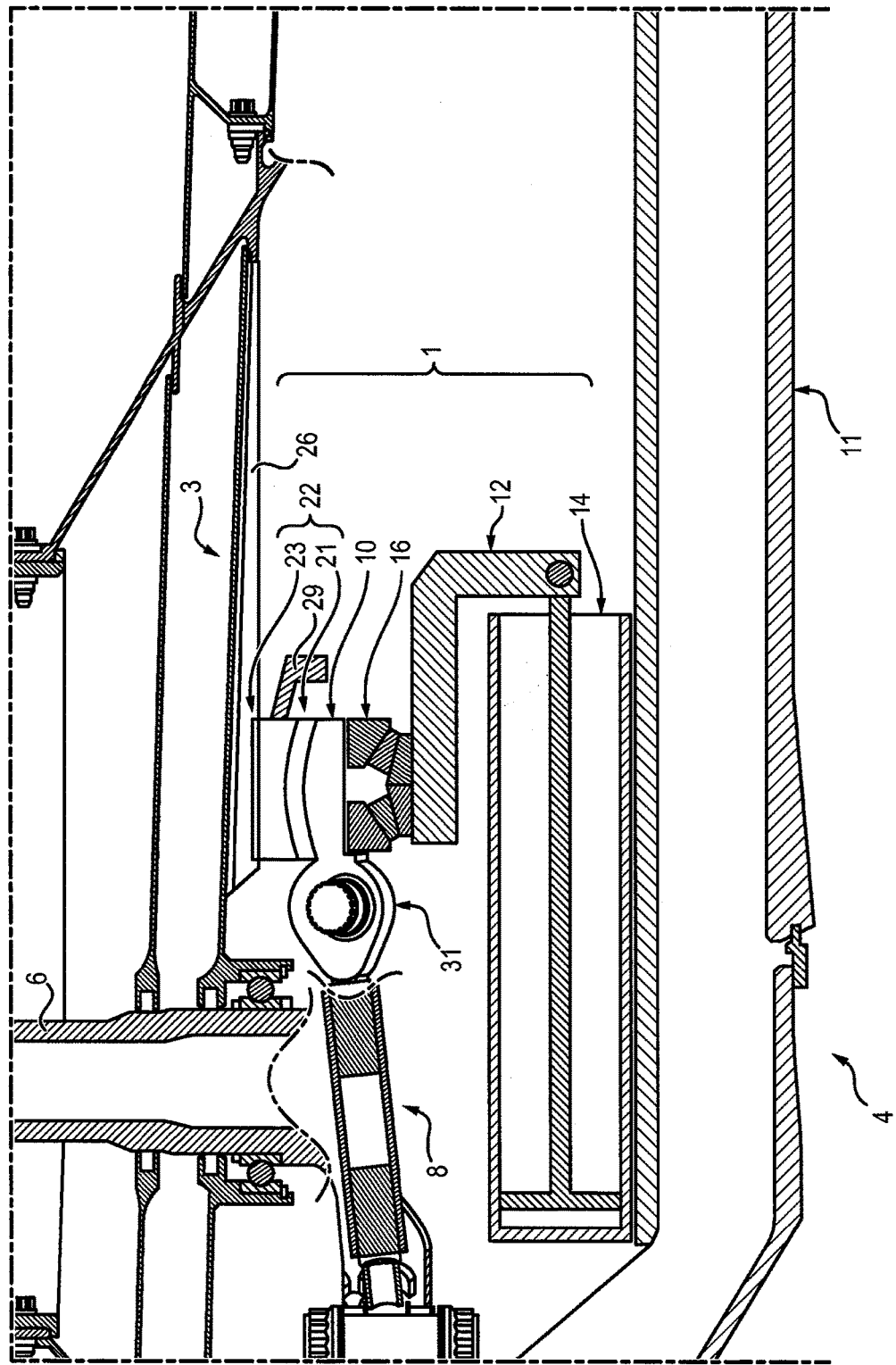
FIG. 1 shows an embodiment of a device for controlling the pitch of the rotor blades of a fan.

FIGS. 1 to 6 show one embodiment of a device 1 for controlling the pitch of the blades of a fan 4 rotor 3.

The device 1 comprises a radial shaft 6 linked to the blade (not shown). Conventionally, the foot of the blade is mounted on the radial shaft 6 by means of a pivot. The radial shaft 6 is capable of rotating about its axis.

The device 1 also comprises a connecting rod 8 for each blade, which axis displacement controls rotation of the radial shaft 6 about its axis. A portion of the connecting 8 is linked to the radial shaft 6 for this purpose, for example through a pivot link.

The device 1 also comprises a first part 10. This first part 10 is secured to a rotor 3 of the fan 4.

Thus, the first part 10 is that is mobile in rotation with the rotor 3 about the axis 11 of the fan 4.

The other end 31 of the connecting rod 8 is secured to the first part 10.

The device 1 also comprises a second part 12 linked to the first part 10, the role of which is disclosed below.

The first and the second parts 10, 12 are typically axisymmetric parts. For example, the first part 10 is annular, and the second part 12 is a disk.

The device 1 comprises at least three cylinders 14 capable of moving said second part 12 in axial translation about the axis 11 of the fan 4, and varying its tilt. Therefore the second part 12 has at least three degrees of freedom controlled by the cylinders 14. These cylinders 14 may for example be conventional hydraulic cylinders.

If there is no control of the cylinders 14, the second part 12 is generally arranged in a radial plane (vertical plane), the cylinders 14 being used to tilt the second part 12 relative to this nominal position.

In one configuration, these cylinders 14 are arranged at 120° from each other. In general, the cylinders 14 are located in the same plane.

The first part 10 and the second part 12 are mechanically linked, therefore the axial translation and the tilt of the second part 12 create a corresponding axial translation and tilt of the first part 10.

Figure 4:
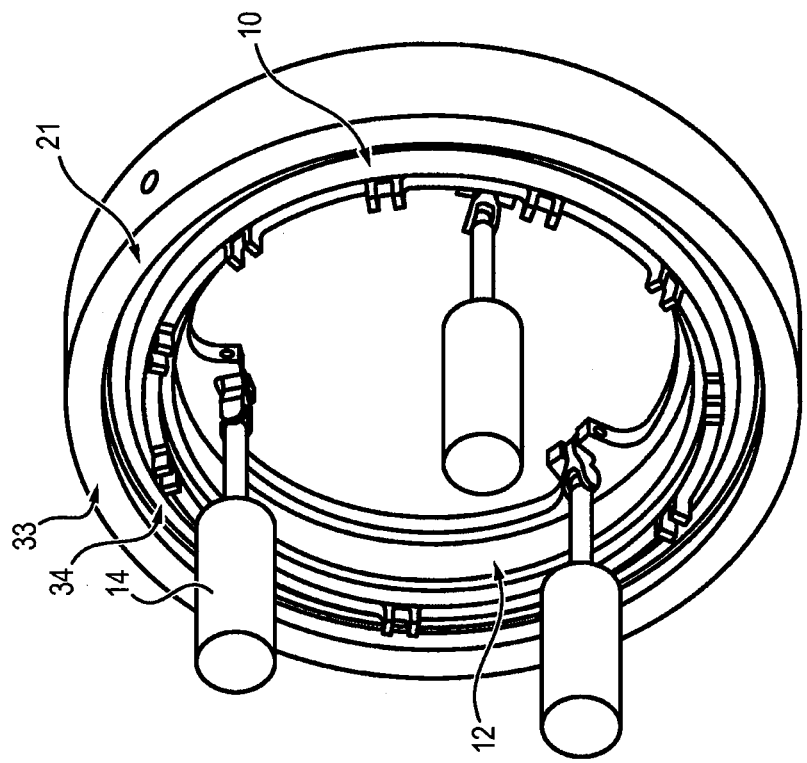
FIGS. 3 and 4 show a three-dimensional view of part of the device.
Figure 3:
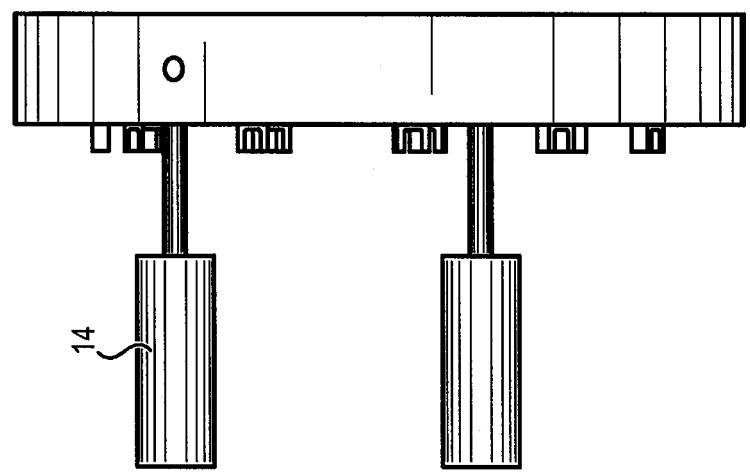

For example in FIGS. 3 and 4, the three cylinders have exactly the same extension. The first part 10 and the second part 12 are positioned in a radial plane.

Figure 6:
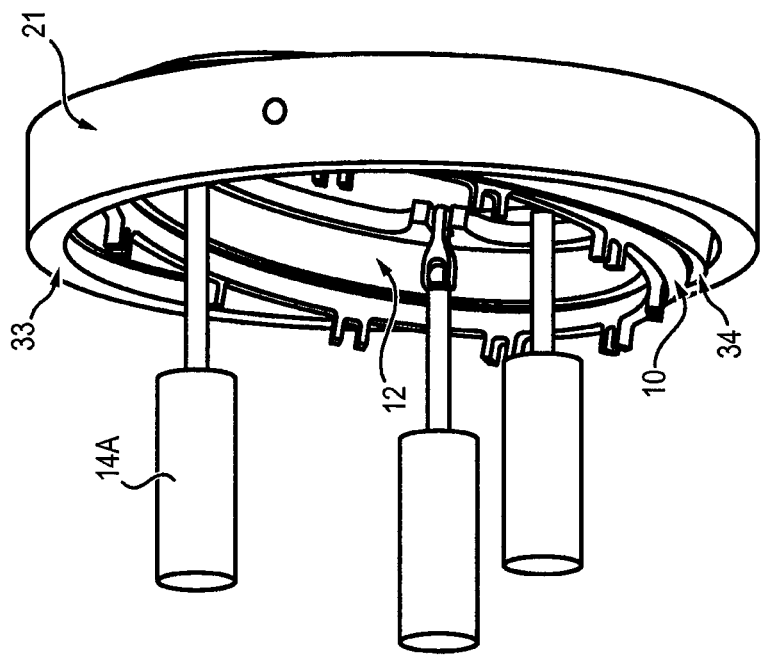
FIGS. 5 and 6 show a three-dimensional view of part of the device when one of the parts is tilted by means of the cylinders.
Figure 5:
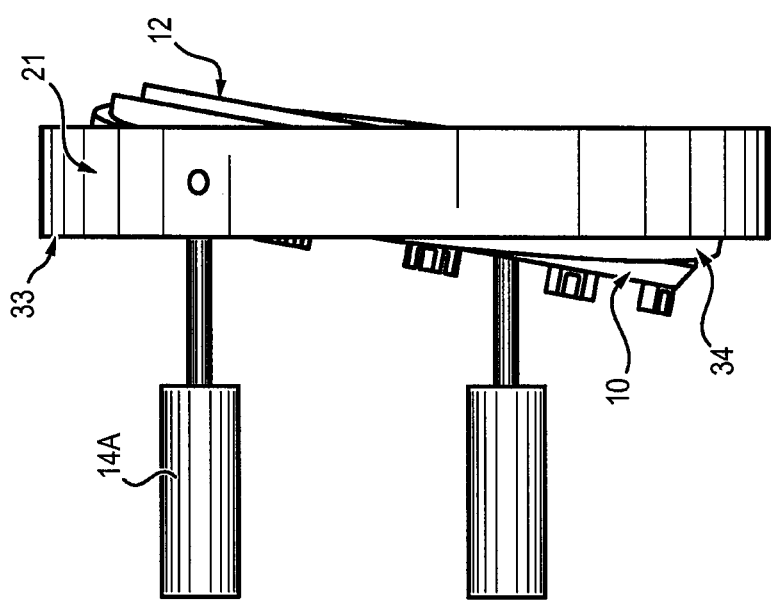
Figure 9:
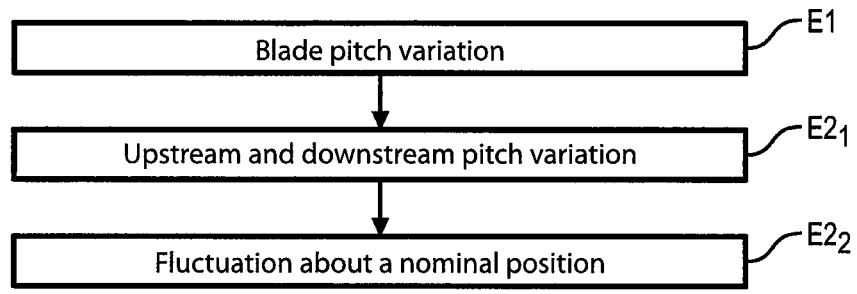
FIG. 9 shows an embodiment of a method for controlling the blade pitch.

In FIGS. 5 and 6, one of the cylinders (cylinder 14$_A$) receives an extension command (for example the cylinder changes from an extension of 150 mm to an extension of 200 mm), while the other cylinders (12B, 12C) keep their original extension.

Consequently, the second part 12 and therefore the first part 10 are shifted towards a plane inclined relative to the radial plane.

Tilting the second part 12 tilts the first part 10 relative to a radial plane. Consequently, after tilting the first part 10, the first part moves in rotation in a plane inclined from a radial plane.

Due to this tilt, when the first part 10 rotates, each connecting rod 8 is subjected to an axial displacement with a variable amplitude. This is due to the fact that the end 31 of the connecting rod 8 is linked to the first part 10, itself free to rotate in a plane inclined relative to a radial plane. Therefore, during a revolution, each connecting rod 8 has an axial displacement that varies around a turn.

The amplitude of the axial displacement of the connecting rod 8 depends on the tilt of the first part 10. The greater the tilt of the first part 10, the more variable its amplitude becomes around the turn.

Due to this configuration, the device 1 can be used to vary the pitch of the blade during its revolution.

In particular, the pitch of each blade depends on its position on the revolution. Therefore at a given instant, the different blades of the rotor have different pitches that depend on their position around the revolution.

Translation of the first part 10 adjusts the pitch of all blades, since this translation induces a common translation of the connecting rods 8 and therefore a rotation of the radial shafts 6.

The inclination of the first part 10 produces a cyclic pitch control of the blades on the revolution. For a given tilt of the first part 10, the pitch of a given blade varies periodically depending on the axial displacement of the connecting rod 8.

According to one example embodiment, the second part 12 is connected to the first part 10 by a mechanical bearing 16.

Indeed, the second part 12 is linked to the casing (fixed part) of the fan, while the first part 10 is linked to the fan rotor 3.

For example, a ball bearing may be used.

Figure 2:
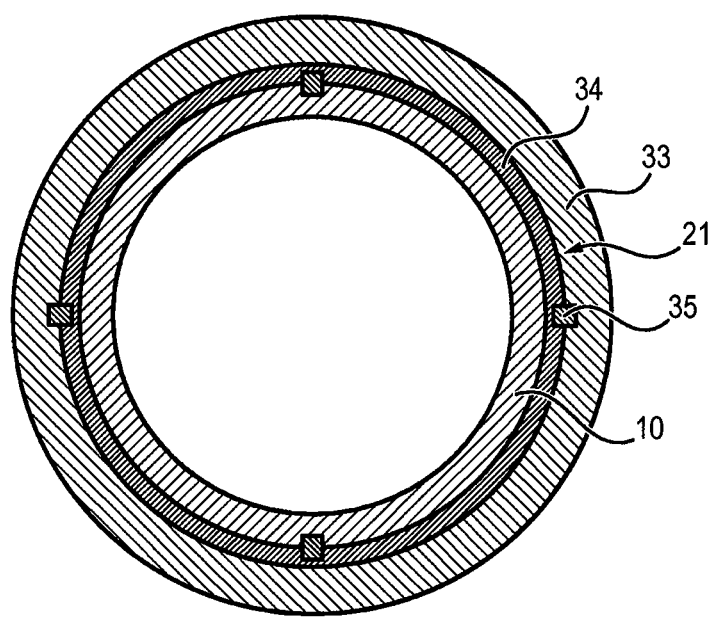
FIG. 2 shows a front view of a part of the device and connecting elements.

In order to link the first part 10 to the rotor 3, the device 1 comprises connecting elements 22, one embodiment of which is shown in FIGS. 1 and 2.

The connecting elements 22 comprising a universal joint 21 in order to link the first part 10 to the rotor 3 rotating about the fan axis 11. This universal joint 21 is diagrammatically shown in FIG. 2, in the form of two annular parts 33, 34 connected by pins 35 and surrounding the first part 10.

Moreover, the connecting elements 22 are provided with keys or grooves 23 to enable axial guidance of the first part 10 relative to the rotor 3. These keys 23 are used for axial guidance of the first part 10 relative to the rotor 3.

In one embodiment, the keys 23 participate in axial guidance relative to the tilted shells 26. For example, this may be the wall of the chamber containing fan oil, which must slope to enable drainage.

The top and bottom surfaces of the keys 23 are parallel to the engine axis.

The shell 26 is also provided with grooves 30 complementary to the keys 23. These complementary grooves 30 have a tilted groove bottom surface 32 (tilted relative to the axis 11 of the fan 4) to implement the oil drainage function (which is the original function of the part 26).

The surface 36 of the top of the grooves 30 complementary to the keys 23 is horizontal, while the other surface 32 is tilted, to enable cooperation with the tilted part 26.

According to one example embodiment, the keys 23 are placed on an outside surface of the universal joint 21.

In some cases, as in the case of rotors located on the downstream side of some fans, the problem arises of securing the device 1 and particularly the cylinders 14.

In the case of these downstream rotors, there is no possible link with the fan structure because the parts at this level cannot resist the forces necessary for such a link. For example it may be the fan duct 20, containing hydraulic channels and electrical power supplies for some sensors, said duct 20 being incapable of resisting to forces imposed by the device 1.

Therefore, a fixed coordinate system has to be recreated.

To achieve this, according to one example embodiment, the device 1 comprises a connecting bearing 18 linking the cylinders 14 to a structure of the rotor 3. Axial and radial forces imposed by the device 1 are resisted by this bearing 18.

Furthermore according to one example, the device 1 also comprises an elastic damper 19 linking the cylinders 14 to a duct 20 of the fan 4. This damper 19 attenuates axial deformations due to thermal effects and is advantageously positioned between the duct 20 and the structure of the rotor 3 onto which the bearing 18 is secured. In particular, this damper 19 that may for example be a metal bellows, prevents axial load from being applied to the duct 20 and preventing the configuration from being statically indeterminate.

Thus, the duct 20 does not resist any structural loads due to the device 1.

In the device 1, at least three cylinders 14 are installed. These cylinders 14 are usually conventional cylinders that are simpler to install than annular cylinders according to prior art.

In one embodiment, stops 29 are provided so as to limit the tilt of the first and/or the second part 10, 12, in order to avoid increasing the failure rate of the device. For example, the stops 29 may be installed on the universal joint 21. Alternately, the stops 29 may be put into position on the second part 12.

By limiting the tilt to a threshold value, for example plus or minus 5°, the variation amplitude of the blade pitch is limited for example to plus or minus 2° (these values are purely illustrative and are not limitative).

Thus if there is a failure in one of the three cylinders 14, a degraded operating mode occurs but which does not require an engine shutdown, since the pitch variation amplitude is limited.

Cylinders 14 are controlled by a control unit, which may for example be integrated into the aircraft computer. The control unit may be programmed to implement embodiments of the pitch control methods disclosed below.

In particular, the device 1 may be used in an open rotor type fan 4, comprising two counter-rotating propellers. In this case, a first device is used to set the pitch of rotor blades of the upstream propeller, and a second device is used to set the pitch of rotor blades of the downstream propeller.

Control Method

In one embodiment, a method for controlling the pitch of the blades includes step E1 consisting of controlling cylinders 14 to modify the tilt of the first part 10.

During rotation of the first part 10, each connecting rod 8 is moved along an axial displacement with a variable amplitude that depends on the tilt of the first part 10.

Consequently, the blade pitch varies during a revolution of the blade about the axis 11 of the fan 4.

The control imposed by the cylinders 14 selects the tilt of the first part 10, through the tilt of the second part 12.

This control may vary during the flight, for example depending on flight conditions or depending on the state of the aircraft.

The translation control imposed by the cylinders 14 on the second part 12 also imposes a common modification to the pitch of all blades of the rotor 3.

Figure 10:
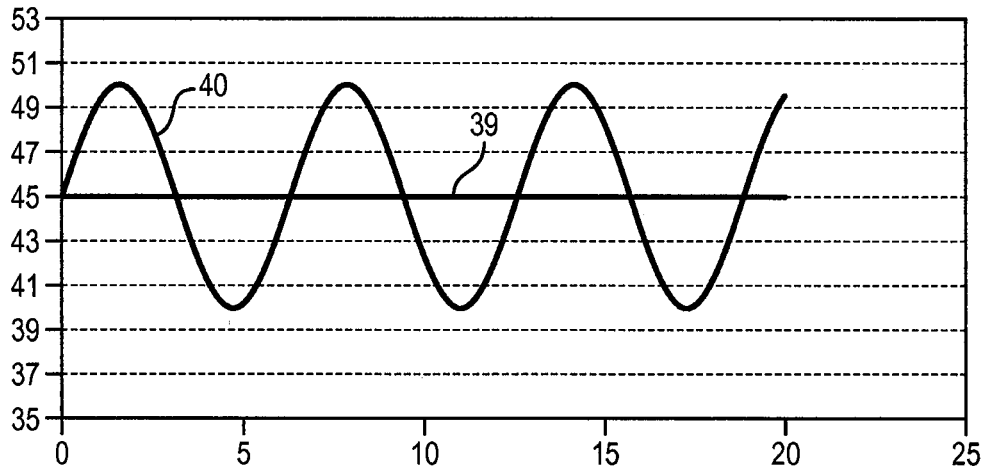
FIGS. 10 and 11 show controls for varying the blade pitch during their revolution.

A diagrammatic example of control is shown in FIG. 10. A translation command by cylinders 14 imposed on the second part 12 imposes a pitch of 45° on all blades (curve 39).

Tilting the second part 12 causes a tilt of the first part 10 which introduces a sinusoidal type variation of the pitch of each blade depending on the position of the blade around its revolution (curve 40).

The tilt of the first part 10 that controls the cyclic change in the pitch of the blades during a turn, is chosen to reduce pressure and lift losses due to the presence of an obstacle on the upstream side of the fan 4, for example such as a wing or the fuselage.

Losses of lift caused by the obstacle produce a loss of lift with a fixed profile that may be known by simulation or by test. The blade pitch is chosen from these data, to compensate for losses of lift in zones in which these losses occur.

Figure 11:
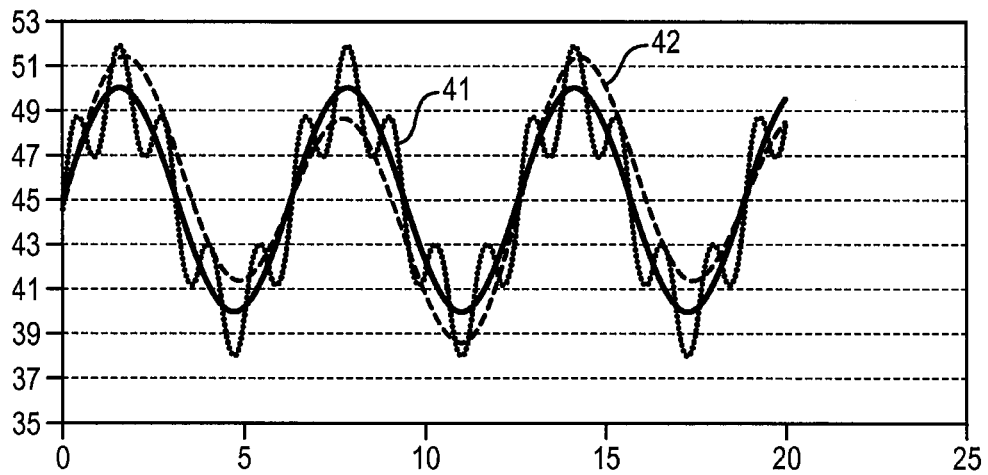

In one embodiment shown in FIG. 11, a multi-cyclic or sub-cyclic control is applied.

According to one example, the method comprises a step consisting of fluctuating the tilt of the first part 10 of the device 1 at a frequency higher than the rotation speed of the rotor 3 (curve 41). In particular, this may be a so-called multi-cyclic control, in other words for which the variation frequency is a multiple of the rotor rotation frequency.

According to one example, the method comprises a step consisting of fluctuating the tilt of the first part 10 of the device 1 at a frequency less than the rotation speed of the rotor 3 (curve 42). In particular, this may be a so-called sub-cyclic control, in other words for which the variation frequency is a fraction of the rotation frequency of the rotor.

In particular, these blade pitch controls can reduce undesirable sound and/or mechanical amplifications.

In particular, the aero-acoustic symmetry of each propeller is broken, and interaction noise between the upstream propellers and downstream propellers can be reduced.

In the case of a fan 4 comprising an upstream rotor 3 and a downstream rotor 3, in one embodiment the method may include step $E2_1$ that consists of obtaining a cyclic variation of the pitch of the blades of the upstream rotor 3 of the fan 4 during the revolution that is different from the cyclic variation of the pitch of the blades of the downstream rotor 3 of the fan 4.

This can be done by imposing a tilt of the first part 10 of a device 1 of the rotor located on the upstream side that is different from the tilt of the first part 10 of another device 1 of a rotor on the downstream side.

Consequently, aero-acoustic coupling between the upstream and downstream blades is reduced which can reduce interaction noise between the blades and the amplification of mechanical vibrations.

According to one example embodiment, this step $E2_1$ comprises the step $E2_2$ consisting of fluctuating the tilt of the first part 10 of the upstream rotor or the downstream rotor about a nominal position.

For example, the nominal position is chosen to correspond to the tilt and therefore to the pitch of the blades, which can reduce the aerodynamic influence of a given obstacle as disclosed above.

A fluctuation of the tilt about this nominal position is also made in order to also reduce the interaction noise between upstream and downstream blades, this fluctuation being different on the upstream and the downstream sides (for example due to the presence of an upstream fluctuation and the absence of a downstream fluctuation, or the choice of different fluctuations between the upstream and downstream sides). Mechanical and acoustic coupling of the upstream and downstream blades is thus reduced or even eliminated.

As can be understood, the invention is capable of reducing the harmful effects of non-homogenous aerodynamic flows affecting fan blades, and noise caused by the blades.

The invention claimed is:

1. Device for controlling the pitch of the blades of a fan rotor comprising a radial shaft linked to the blade, a connecting rod the axial displacement of which controls rotation of the radial shaft, comprising:
    a first part that is mobile in rotation with the rotor about the fan axis and on which one end of each connecting rod is secured,
    a second part linked to the first part, and
    at least three cylinders capable of moving said second part in axial translation and varying its tilt, translation and tilt of the second part leading to a corresponding translation and tilt of the first part,
    such that when the first part rotates, each connecting rod follows an axial displacement with a variable amplitude that depends on the tilt of the first part in order to vary the pitch of the blade during its revolution.

2. Device according to claim 1, in which the second part is linked to the first part by a mechanical bearing.

3. Device according to claim 1, comprising a connecting bearing linking the cylinders to the rotor.

4. Device according to claim 3, further comprising an elastic damper linking the cylinders to a duct of the fan.

5. Device according to claim 1, in which the first part is linked to the rotor by connecting elements comprising a universal joint.

6. Device according to claim 5, in which the connecting elements further comprise keys for axial guidance of the first part relative to the rotor.

7. Device according to claim 6, comprising grooves complementary to the keys, one surface of which is tilted to enable cooperation with a tilted part of the rotor.

8. Device according to claim 1, comprising stops limiting the tilt of the first and/or the second parts.

9. Fan of a turbomachine comprising:
    at least one rotor and variable pitch blades, and a control device to set the pitch of its blades according to claim 1.

10. Method for controlling the pitch of the blades of a fan rotor, using the control device, according to claim 1, comprising a step consisting of controlling the cylinders to modify the tilt of the first part,
    such that during rotation of the first part, each connecting rod is moved along an axial displacement with a variable amplitude that depends on the tilt of the first part, the blade pitch varying during its revolution about the axis of the fan.

11. Method according to claim 10, comprising a step of imposing a tilt on the first part of a device of a rotor located on the upstream side of a fan that is different from the tilt of the first part of another device of a rotor located on the downstream side of the fan.

12. Method according to claim 11, in which the step of imposing a tilt includes a step of fluctuating the tilt of the first part of the device or the upstream rotor or the downstream rotor about a nominal position.

13. Method according to claim 10, comprising the step of fluctuating the tilt of the first part of the device at a frequency higher or lower than the rotation speed of the rotor.

* * * * *